Aug. 13, 1963 B. E. BARNES Re. 25,432

LIFT TRUCK

Original Filed Aug. 5, 1950 9 Sheets-Sheet 1

INVENTOR.
Brown E. Barnes
BY Albert J. McCaleb
Att'y.

LIFT TRUCK

Original Filed Aug. 5, 1950 9 Sheets-Sheet 2

INVENTOR.
Brown E. Barnes
BY Albert G. McCaleb
Att'y

LIFT TRUCK

Original Filed Aug. 5, 1950 9 Sheets-Sheet 3

INVENTOR.
Brown E. Barnes
BY Albert G. McCabe
Att'y.

LIFT TRUCK

Original Filed Aug. 5, 1950 9 Sheets-Sheet 4

INVENTOR.
Brown E. Barnes
BY Albert G. McCaleb
Atty.

INVENTOR.
Brown E. Barnes
BY Albert G. McCaleb
Att'y.

LIFT TRUCK

Original Filed Aug. 5, 1950 9 Sheets-Sheet 6

INVENTOR.

Brown E. Barnes

BY Albert G. McCaleb

Att'y.

LIFT TRUCK

Original Filed Aug. 5, 1950 9 Sheets-Sheet 7

INVENTOR.
Brown E. Barnes
BY Albert G. McCaleb
Att'y.

LIFT TRUCK

Original Filed Aug. 5, 1950 9 Sheets-Sheet 8

INVENTOR.
Brown E. Barnes
BY Albert S. McCalel
Att'y.

LIFT TRUCK

Original Filed Aug. 5, 1950 9 Sheets-Sheet 9

INVENTOR.
Brown E. Barnes
BY Albert G. McCabe
Att'y.

United States Patent Office

Re. 25,432
Reissued Aug. 13, 1963

25,432
LIFT TRUCK

Brown E. Barnes, Portland, Oreg., assignor to Hyster Company, a corporation of Nevada Original No. 2,595,120, dated Apr. 29, 1952, Ser. No. 177,942, Aug. 5, 1950. Application for reissue Nov. 14, 1961, Ser. No. 152,973
20 Claims. (Cl. 187—9)

Matter enclosed in heavy brackets [ ] appears in the original patent but forms no part of this reissue specification; matter printed in italics indicates the additions made by reissue.

This invention relates to lift trucks and more particularly to the load lifting mechanism and structure of such lift trucks.

One of the general objects of this invention is to provide a lift truck having a load lifting mechanism which has a relatively low minimum height and which is constructed and arranged to lift a load to a substantial height without increasing the said minimum height of the structure.

Another object of my invention is to provide a load lifting mechanism for a lift truck which, although having a relatively low minimum height, is adapted to extend to a relatively high maximum height.

Considered in somewhat greater detail, it is within the purview of this invention to provide an extensible load lifting frame embodying relatively movable frame sections which carry a load lifting apron and are positively latched in a collapsed position until the load lifting apron reaches a maximum height thereon, whereupon the frame is extended to carry the apron above the collapsed height of the frame.

My invention further comprehends the provision of an extensible load lifting frame having a plurality of sections movable in sequence relative to a base section and provided with positive stop elements for effecting the proper limits of extension and sequence of movements of each section with reference to others.

As another object of this invention I have provided a lift truck embodying a load hoisting mechanism having frame sections linearly movable relative to one another and actuated by a hydraulic hoist, and wherein flexibility is provided in the mounting of the hoist so that it aligns itself for effective and efficient operation relative to the sections and under varying conditions of loading and use.

It is further comprehended by this invention to provide a lift truck having a load hoisting mechanism as set forth in the preceding object and wherein a guide is provided for maintaining the hydraulic hoist in substantially parallel relationship to the sides of the frame sections.

The load hoisting mechanism of my lift truck also embodies a drive chain for linearly moving frame sections relative to one another, and has the drive chain anchored to the lower portion of a load lifting apron which is movable along the frame, as well as being otherwise disposed on sheaves and anchored to minimize the variations of the angle of lift through the chain as the apron position is varied.

Other objects and advantages of the invention will be apparent from the following description and the accompanying drawings, in which similar characters of reference indicate similar parts throughout the several views.

Referring to the nine sheets of drawings accompanying this specification,

Figure 2:
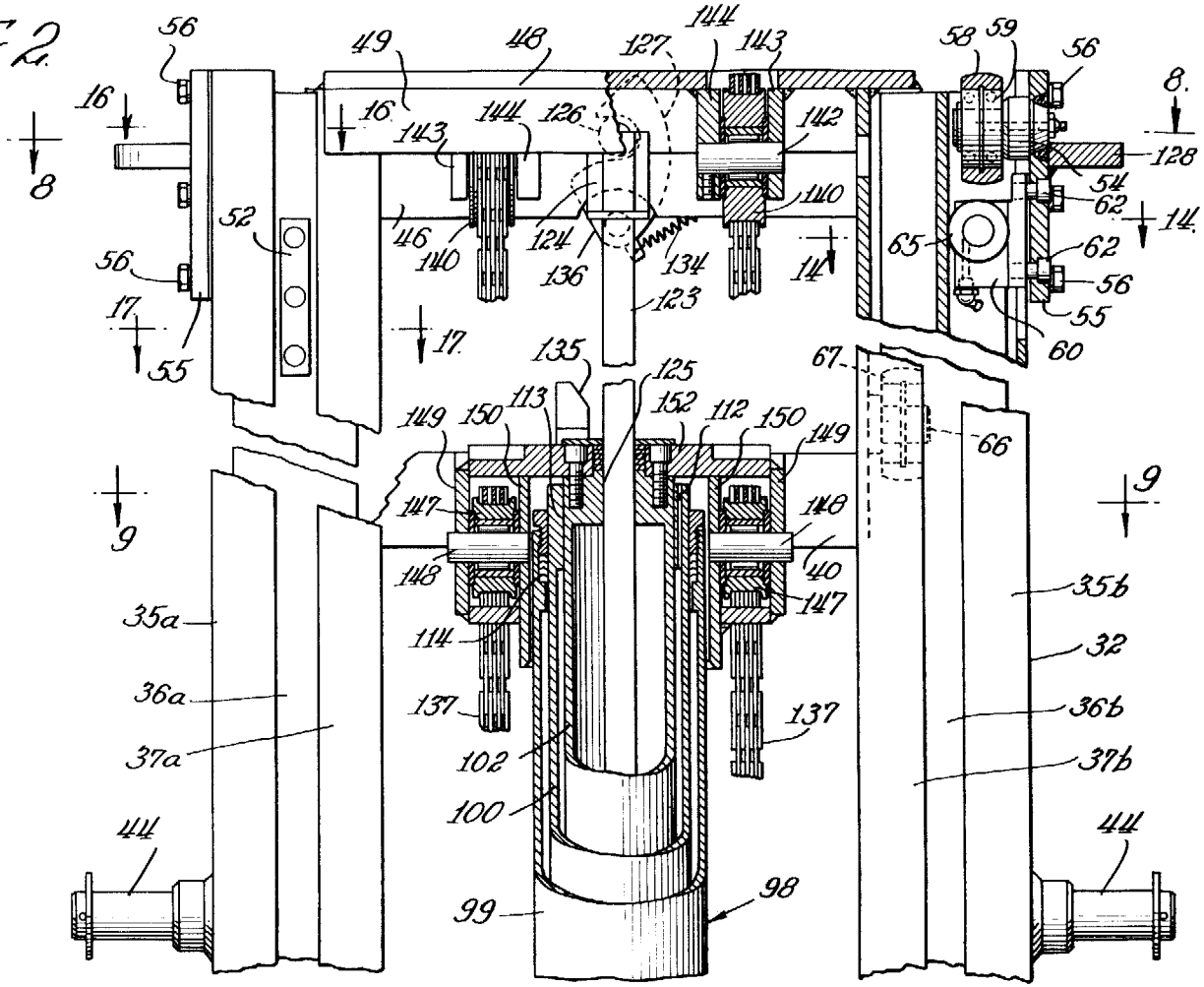
FIG. 2 is a fragmentary front elevational view of the upper part of my preferred load hoisting mechanism, with parts thereof broken away and shown in section to illustrate certain details of structure.
Figure 3:
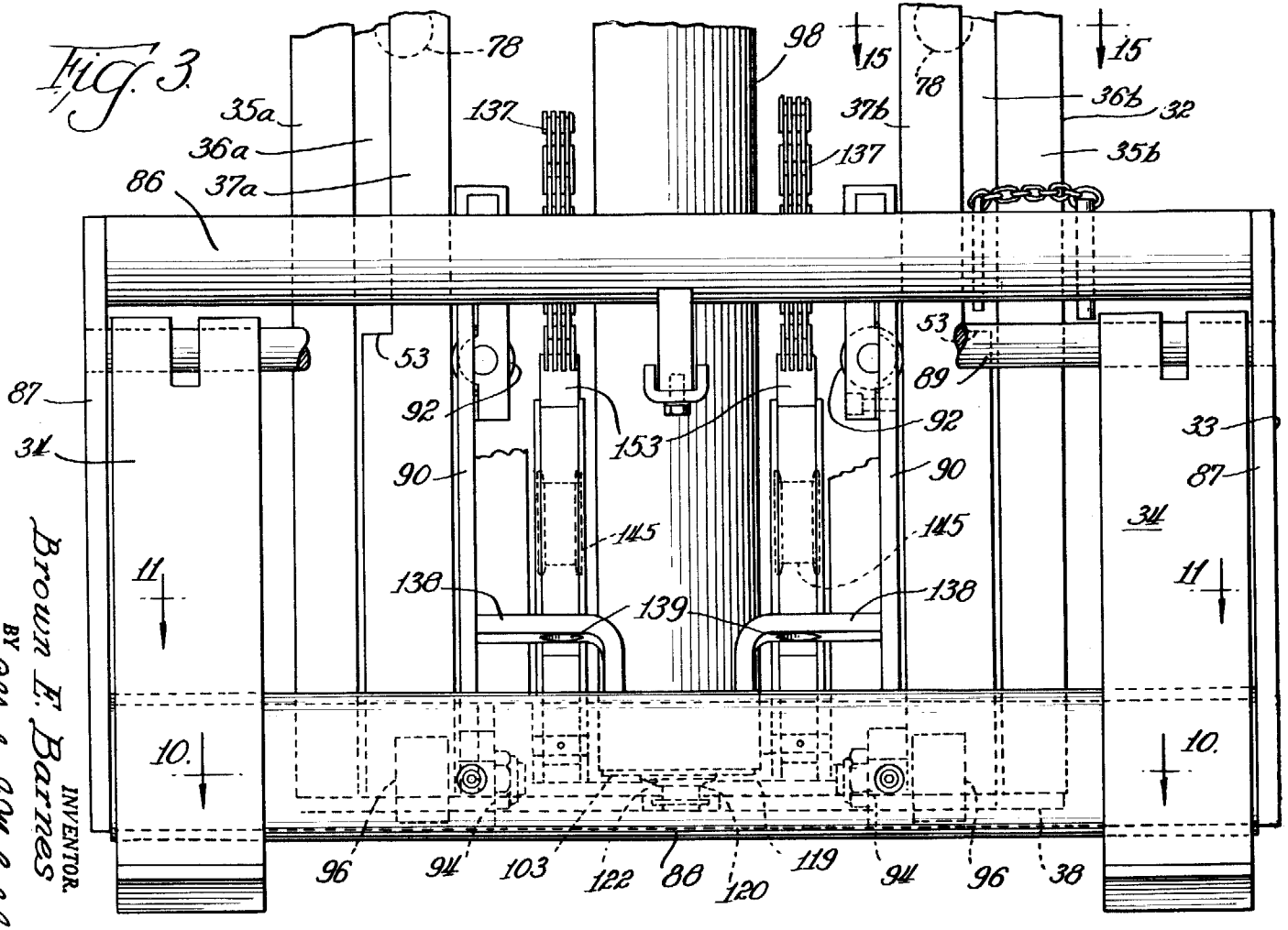
FIG. 3 is a fragmentary front elevational view, drawn to substantially the same scale as FIG. 2 and illustrating the lower portion of my preferred load hoisting mechanism.
Figure 8:
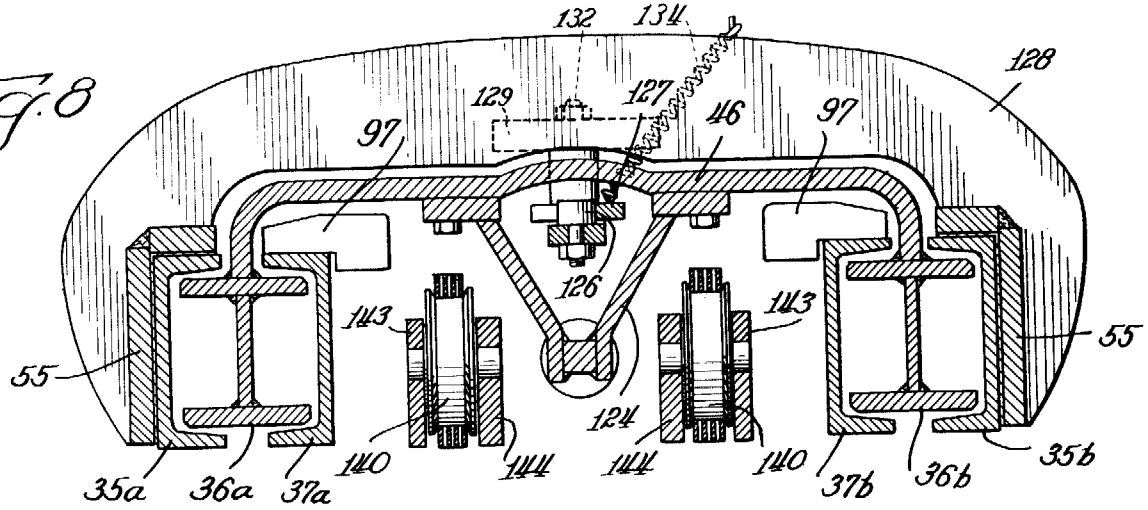
Figure 9:
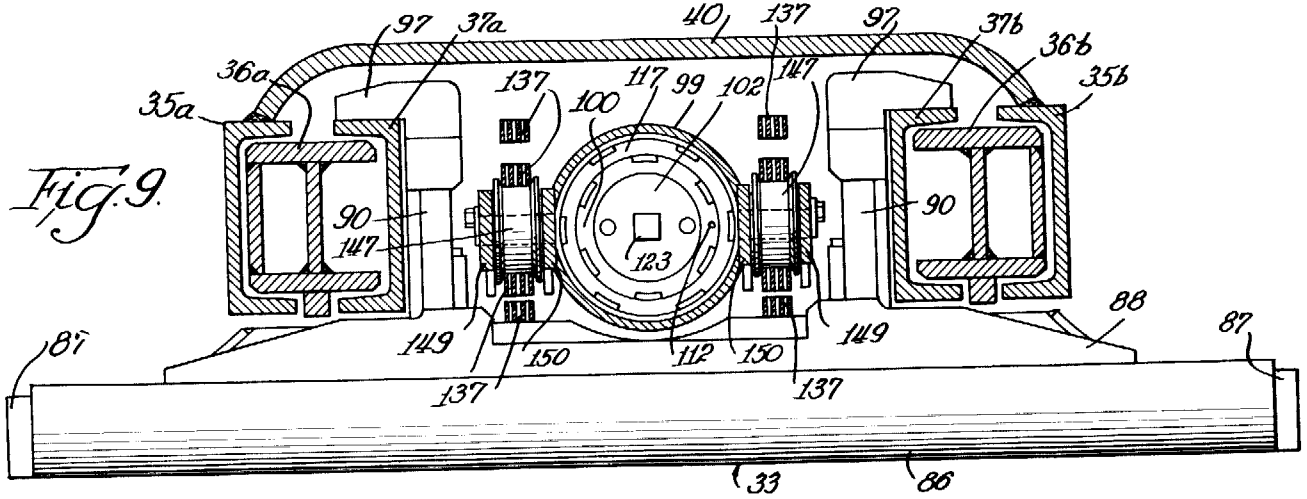
Figure 10:
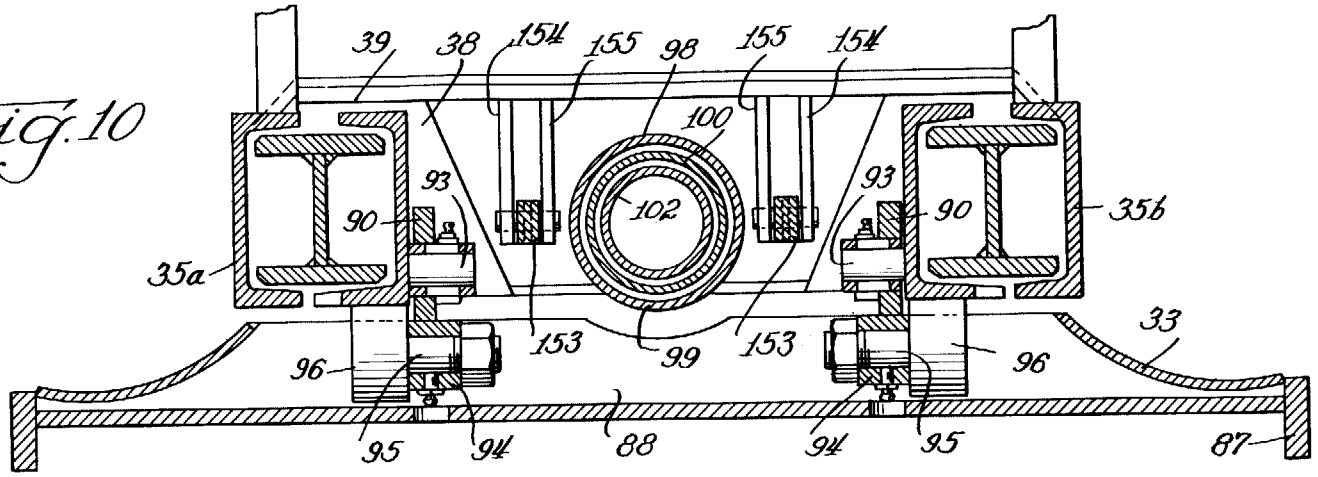
Figure 11:
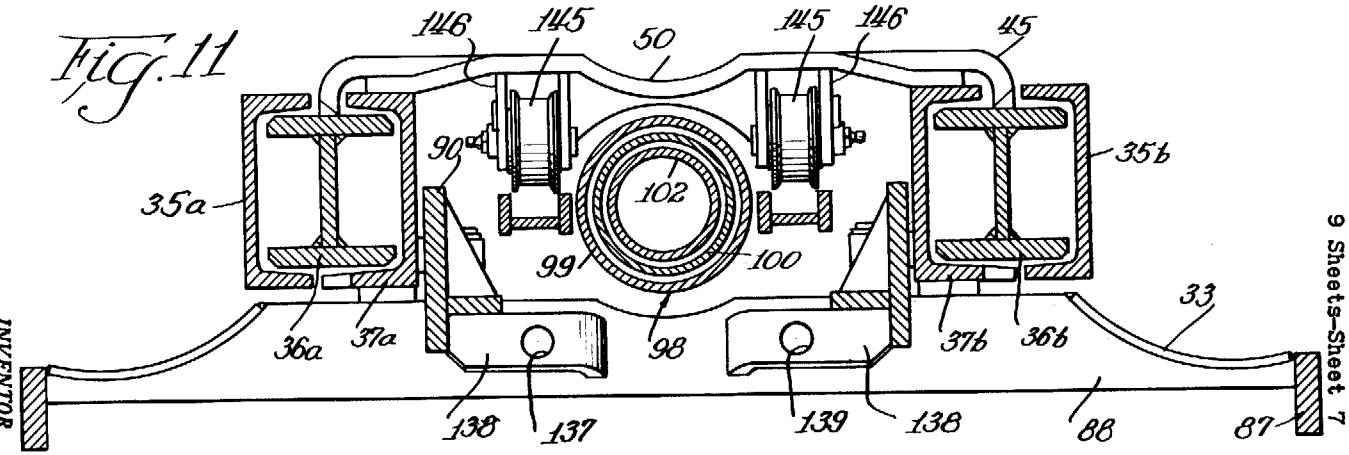
Figure 12:
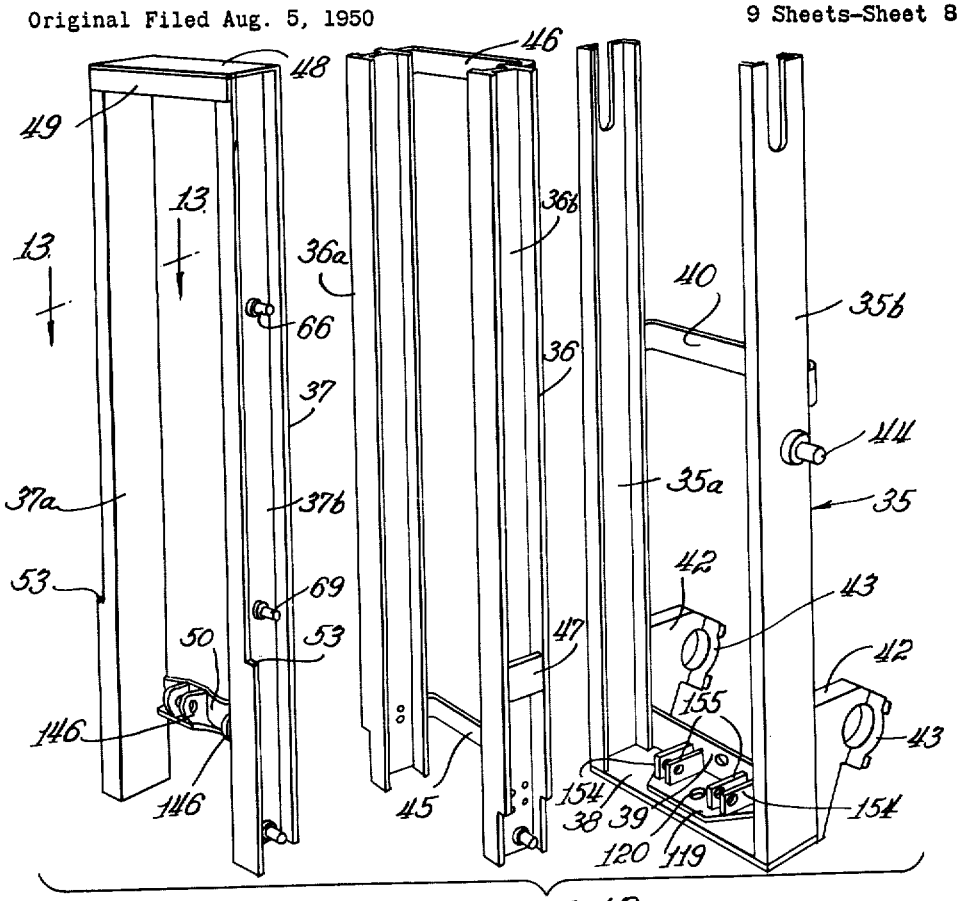
Figure 18:
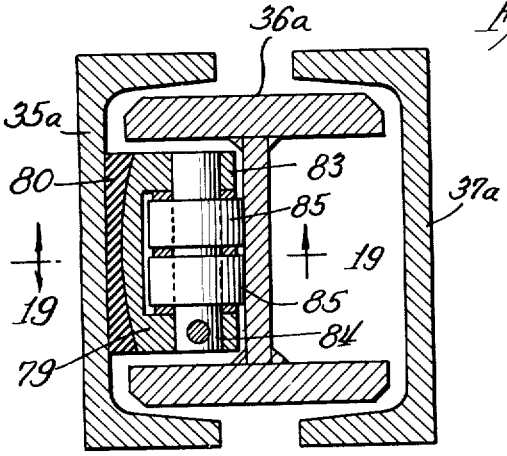
Figure 19:
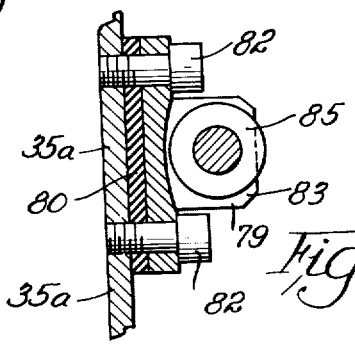
Figure 13:
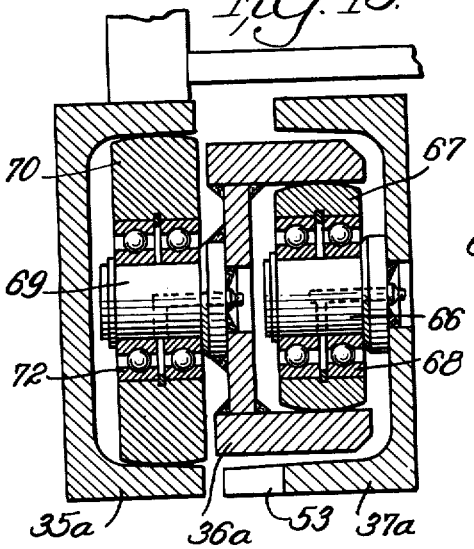
Figure 14:
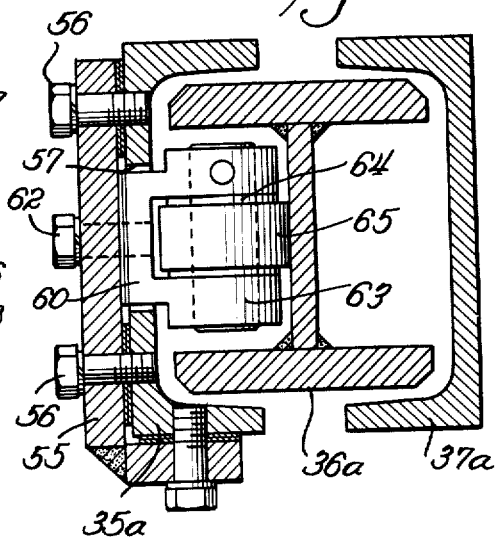
Figure 15:
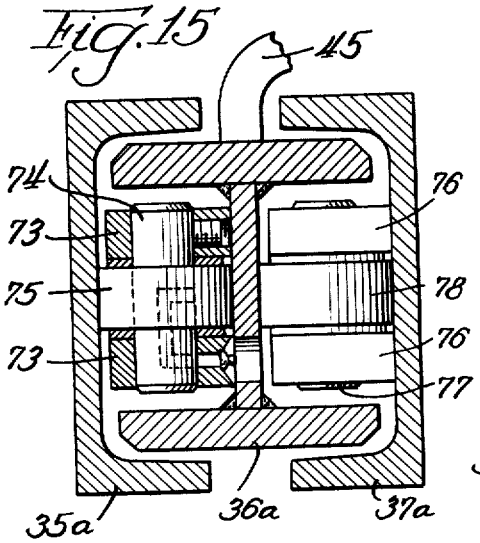
Figure 16:
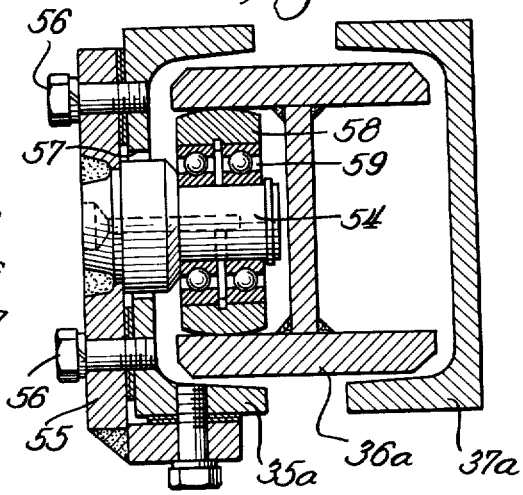
Figure 17:
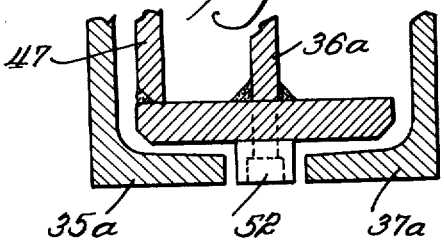

FIGS. 8 and 9 are respectively top sectional views taken at positions designated by lines 8—8 and 9—9 in FIG. 2;

FIGS. 10 and 11 are top sectional views respectively at positions indicated by lines 10—10 and 11—11 of FIG. 3;

FIG. 12 is an exploded view illustrating the structure of preferred forms of frame sections utilized in my preferred load hoisting mechanism;

FIG. 13 is a fragmentary sectional view, through the load lifting frame assembly, drawn to an enlarged scale, and wherein the section is taken substantially at the position designated by a line 13—13 in FIG. 12;

FIG. 14 is a sectional view taken substantially at a position designated by a line 14—14 in FIG. 2;

FIG. 15 is a sectional view taken substantially at a position indicated by a line 15—15 in FIG. 2;

FIG. 16 is a sectional view taken substantially on a line 16—16 of FIG. 2;

FIG. 17 is a fragmentary sectional view taken substantially on a line 17—17 of FIG. 2;

FIG. 18 is a sectional view similar to FIG. 15 and illustrating a modified form of roller mounting adapted to be utilized in the disclosed apparatus; and FIG. 19 is a fragmentary side sectional view of the modified structure which is illustrated in FIG. 18, the section being taken substantially on a line 19—19 of FIG. 18.

Considered in its more general aspects, the exemplary embodiment of my invention which is shown herein for illustrative purposes, is particularly adapted to use on industrial lift trucks of the type utilized in shops, factories, and the like, for lifting, moving and stacking relatively heavy loads, as well as for the movement and packing of such loads in relatively limited spaces, such as box cars. In many instances, in the use of such lift trucks, overhead space is limited, and yet it is desirable to utilize the space to the fullest extent. My disclosed apparatus is particularly devised with a view to the limitation of the overhead space required by the apparatus, as compared to the height to which the load is lifted for effective handling purposes.

Figure 1:
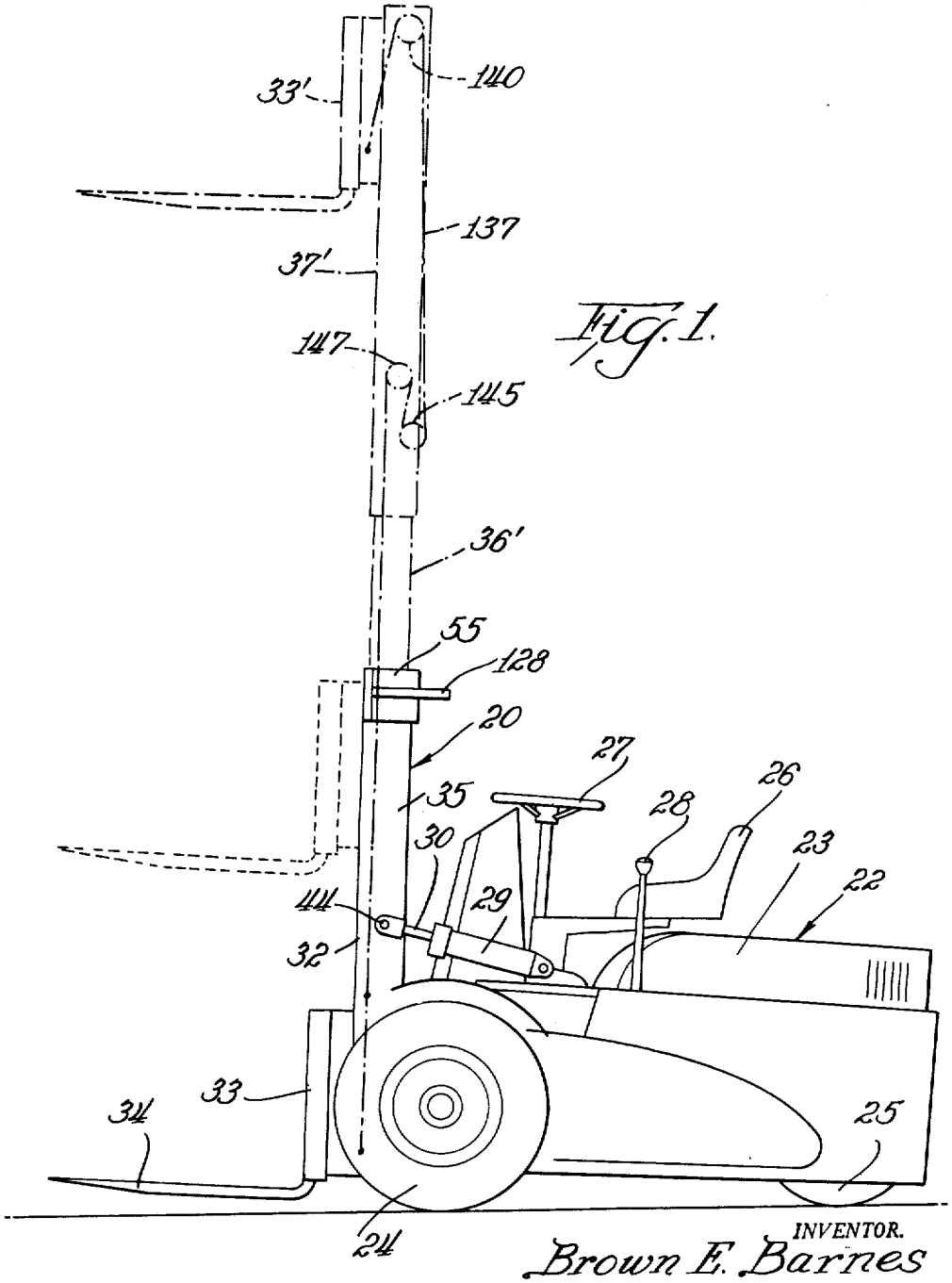
FIG. 1 is a side elevational view of a lift truck embodying a preferred form of my load hoisting mechanism and has elevated positions of the load hoisting mechanism depicted in dot and dash lines.

In the general view of FIG. 1, my preferred load lifting apparatus which is indicated generally by the reference numeral 20 is shown in its adaptation to an industrial lift truck 22 having a body 23 which houses operating parts including a prime mover such as an internal combustion engine, equipment for providing hydraulic fluid under pressure, and suitable driving and control mechanisms. The truck body 23 is supported on front driving wheels such as 24 and rear steering wheels, such as 25. Mounted above the body is an operator's seat 26, a steering wheel 27 and an operating control lever 28. In the disclosed lift truck, hydraulic cylinders 29 each have one end anchored to the truck body and a piston rod 30 connected to a load supporting frame 32 of the load lifting apparatus; said load lifting apparatus being mounted for swinging movement relative to the lift truck body, so that it can be tilted forwardly and rearwardly within predetermined limits relative to the lift truck body and a vertical position. At the forward end of the truck, the load lifting apparatus 20 includes a load lifting apron 33 which has load lifting arms 34 projecting forwardly therefrom for engaging and lifting loads.

Considering my disclosed load lifting apparatus in greater detail, and having reference to the detailed views of the accompanying drawings, one of the essential elements thereof is the extensible load supporting frame 32 which includes an outer or base section 35, an intermediate section 36 and an inner section 37 (FIG. 12); the intermediate and inner sections of which are movable relative to the outer section and to each other, in telescoping relationship to one another, between a collapsed or nested position, as shown in FIGS. 2, 3, 4 and 5 and an extended position, as shown in FIG. 1. The outer or base section 35, as shown in FIGS. 2, 3 and 12, includes upright channel members 35a and 35b which are in spaced, opposed and substantially parallel relationship to one another with their channels opening inwardly. At their lower ends, the channel members 35a and 35b are secured together by tie plates 38 and 39. At an elevated position, the channels are also secured together and braced by a cross tie 40. Secured to the rear surfaces of the channel members 35a and 35b are bearing blocks 42 provided with suitable bearing caps 43 by which the base frame section 35 is mounted for limited swinging movement relative to the front axle housing of the lift truck. With this supporting arrangement, the piston rods 30 of two similar hydraulic cylinders 29 on opposite sides of the lift truck are connected to outwardly projecting and coaxial trunnions 44 which are secured to the channel members 35a and 35b respectively, thereby to effect control of the position of the base frame section angularly with respect to the lift truck and the axis of the front axle housing thereof.

The intermediate frame section 36 has two parallel side beams 36a and 36b in spaced and opposed relationship; the beams 36a and 36b being of substantially H-section with their spacing and positions selected, so that the outer channels of the H-sections fit within and open into the channels of the channel members 35a and 35b, as shown in FIGS. 8 to 16 inclusive. Near their lower ends, the beams 36a and 36b are secured together by a cross tie 45, at their upper ends, the beams are secured together by a tie plate 46. On opposite sides of the intermediate frame section, stop blocks 47 (FIG. 12) are secured within the outer channels of the beams near the lower ends thereof to limit the movement of the intermediate frame section relative to the base frame section.

The inner frame section 37 has spaced and substantially parallel channel members 37a and 37b of the section similar to that of the channel members 35a and 35b, but with their channels opening outwardly, in opposed relationship. The spacing of the channel members 37a and 37b is such that those channel members fit between the beams of the intermediate frame section with the inner channels of the beams fitting within and opening into the channel members 37a and 37b, as shown in FIGS. 8 to 16 inclusive. At their upper ends, the channel members 37a and 37b are secured together by a top cross plate 48 and a front cross tie 49, while near their lower ends and the rear of the frame section, they are connected by a tie plate 50. As depicted in FIGS. 2, 12 and 17, stop blocks, such as 52, are secured to the upper end portions of the intermediate frame section in alignment with shoulders 53 on the channel members 37a and 37b to serve as stops for limiting the relative movement of the inner frame section with respect to the intermediate frame section.

To provide for relative ease of movements, of the intermediate and inner frame sections relative to the outer frame section and to one another, as well as to provide for the relative support and bracing of the sections in transverse directions relative to one another, I have provided rollers in various combinations and at longitudinally spaced positions along the sections, and bearing in different directions between those sections, as illustrated in FIGS. 13, 14, 15 and 16. At the top of each of the channel members 35a and 35b of the stationary outer frame section, inwardly projecting stub shafts 54, as shown in FIGS. 2 and 16, are secured to mounting plates 55 which, in turn, are secured to the outer surfaces of the channel members by fastening means, such as cap screws 56. The stud shafts extend into the channels on the outside of the intermediate frame section 36a through slots 57 in the outer channel members 35a and 35b and support rollers 58 which, by preference, are carried by anti-friction bearings 59, relative to the stub shafts 54. These rollers fit between the opposed flanges of the outer channel of the intermediate frame section and provide support for the intermediate frame section relative to the outer frame section and in a direction longitudinally of the lift truck.

Immediately below the rollers 58 and secured to the same plates 55 as the stub shafts 54 are support blocks 60 which are secured to the plates by fastening means, such as cap screws 62 and which extend through the slots 57 into the outer channels of the intermediate frame section. These support blocks 60 have bifurcated end portions 63 and carry cross shafts 64, which cross shafts support rollers 65 at positions for engagement with the outer faces of the webs of the substantially H-shaped frame members of the intermediate frame section. The rollers 65 provide lateral support for the intermediate frame section relative to the outer frame section at the top of the outer frame section. Also, the blocks 60 are in positions to be engaged by the stop blocks 47 on the intermediate frame to limit upward movement of the intermediate frame section relative to the outer frame section.

Somewhat below the top of the outer frame section, at a position indicated in FIG. 12, and as shown in FIG. 13, additional rollers are provided for stabilizing both the intermediate and inner frame sections relative to the outer frame section. The inner frame sections have stub shafts 66 secured thereto which project into the inner channels of the intermediate frame section on the opposite sides of the frame. The stub shafts 66 carry rollers 67, preferably supported for rotation relative to the shafts 66 by antifriction bearings 68. The rollers 67 are aligned for engagement with the opposed inner flange surfaces of the intermediate frame members. At positions substantially aligned with the stub shafts 66, when the frame sections are in their nested relationship, additional stub shafts 69 are secured to the webs of the substantially H-shaped intermediate frame members and project outwardly into the channels of the outer frame members. The stub shafts 69 have rollers 70 mounted for rotation thereon through anti-friction bearings 72, which latter rollers are aligned for engagement with the opposed inner flange surfaces of the outer frame members.

Below the rollers 67 and 70, which are depicted in FIG. 13, another set of rollers provides additional lateral support for the intermediate and inner frame members relative to the outer frame members. The position of the latter mentioned rollers is indicated in FIG. 3 and the full structural arrangement thereof is shown in FIG. 15. As shown in FIG. 15, support blocks 73 are secured to the web of the intermediate frame members in opposed and spaced relationship, and project outwardly into the channels of the outer frame members. The latter support blocks carry a shaft 74 which has a roller 75 mounted for rotation thereon between the support blocks and disposed to engage the inner web surfaces of the outer channel members. Similarly, support blocks 76 are secured to the webs of the inner channel members and project into the inner channels of the intermediate frame members. The support blocks 76 carry shafts 77 which have rollers 78 mounted for rotation thereon intermediate the support blocks and disposed to have running engagement with the inner web surfaces of the intermediate frame members.

In FIGS. 18 and 19, I have illustrated a modified form of roller mounting which is adapted to use in my load lifting frame structure. In this modified structure, as illustrated, a support block 79 is secured to the inner web surface of an outer channel member through a block of resilient material, such as rubber, thereby to afford some flexibility and resilience in the roller mountings. Although mounted with an intervening resilient block 80, the support block 79 is preferably held in place by fastening means, such as cap screws 82 as shown in FIG. 19. A bifurcated end portion 83 is provided on the support block which carries a cross shaft 84 upon which rollers 85 are mounted for engaging the outer web surface of the intermediate frame member. With sets of rollers of the types described mounted between the respective frame sections and with the dispositions of the rollers as shown and described, it may be readily understood that the frame sections are adapted to telescoping movement between nested and extended positions. In the nested positions, the three frame sections are substantially coextensive, while in the extended position the intermediate frame section is moved upwardly along the outer frame section and the inner frame section moved upwardly along the intermediate frame section; there being sufficient overlap between the adjacent frame sections to maintain relative rigidity for load supporting purposes.

The load lifting apron 33 which carries load lifting arms 34 moves along and with the frame sections during the load lifting operation of my disclosed lift truck. This load lifting apron includes a top cross tube 86, side plates 87 and a bottom cross channel 88 which are secured together to form a rectangular frame which occupies a general plane and position extending across the front surface of the load lifting frame. Beneath the top cross tube 86 and secured to the side plates 87 at its opposite ends is a cross bar 89 from which the substantially L-shaped load lifting arms are suspended at opposite sides of the frame; those arms resting against the cross channel 88 for additional support.

Figure 5:
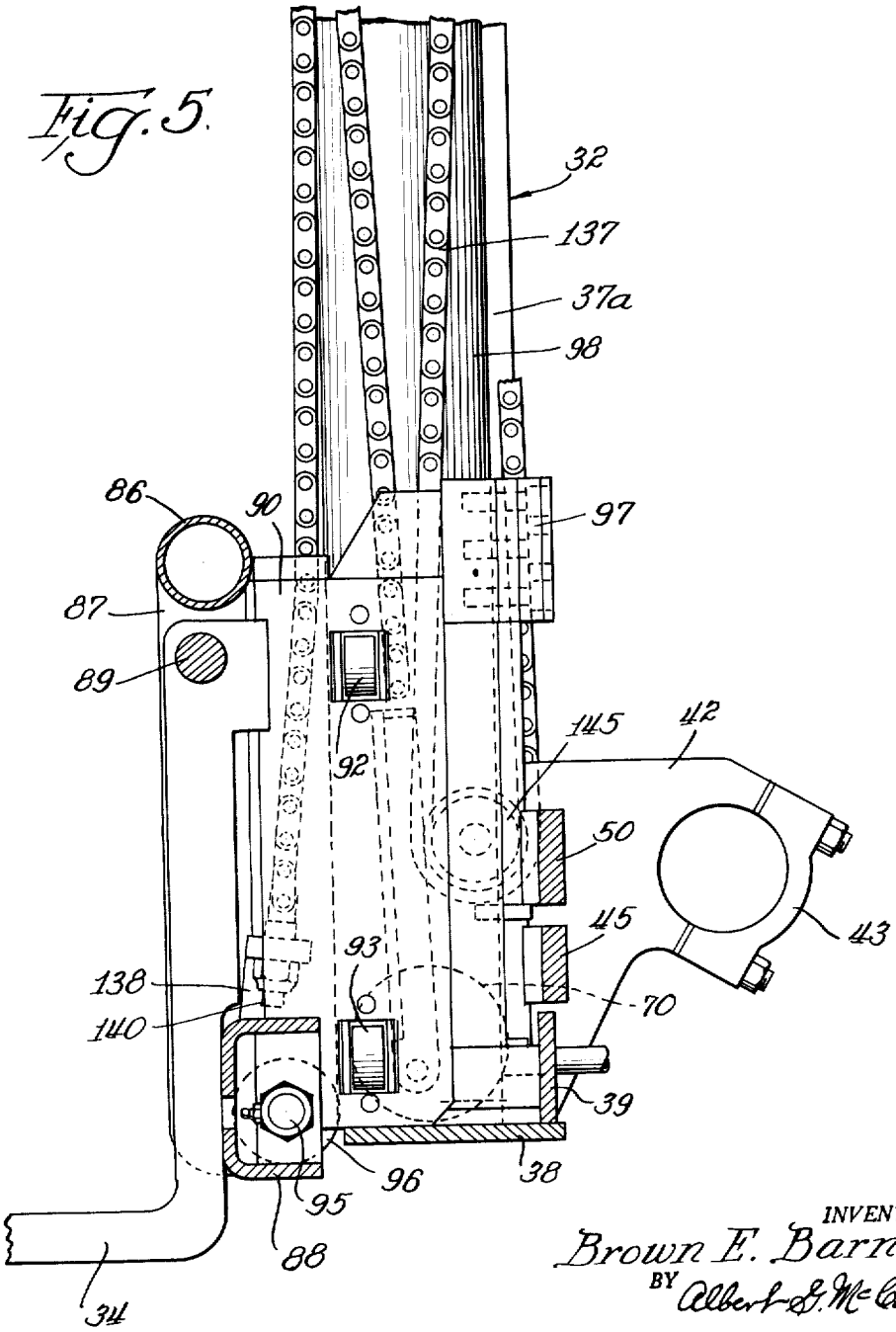

As shown in FIGS. 3, 5, 10 and 11, plates 90 are secured to the apron frame and project rearwardly therefrom at positions such that they lie along the inner faces of the channel members 37a and 37b of the inner frame section. These plates each carry rollers 92 and 93 which have running engagement with the opposed inner faces of the channel members 37a and 37b of the inner frame section for providing lateral stability for the apron with respect to the load lifting frame. In addition, blocks 94 are secured to the inner surface of the cross channel 88 and carry stub shafts 95 upon which rollers 96 are rotatably supported. The latter rollers are aligned for running engagement with the outer surface of the front flange of the channel members 37a and 37b of the inner frame section; thus providing additional support for the load lifting apron during its movements along the load lifting frame. As shown in FIGS. 5 and 9, shoes 97 are secured to the top portions of the plates 90 and project outwardly in opposite directions to overlie portions of the rear flange surface of the channel members 37a and 37b of the inner frame section. These shoes have sliding engagement with the inner frame section and serve as additional guides for the movements of the apron along the inner frame section.

For providing the lifting force for effecting the movements of the frame sections relative to one another and for moving the apron relative to the lifting frame, I have provided a hydraulic cylinder or lift 98. In my preferred structure and arrangement of parts which is disclosed, the hydraulic cylinder 98 has a normal height which is substantially less than that of the nested frame sections, but is capable of sufficient extension to raise the load lifting frame sections to their upper limit of movement and to raise the apron to the top of the extended frame sections. In the present instance, the hydraulic cylinder 98 comprises three relatively movable parts; namely, an outer cylinder 99, an intermediate sleeve 100 and a piston 102.

Figure 7:
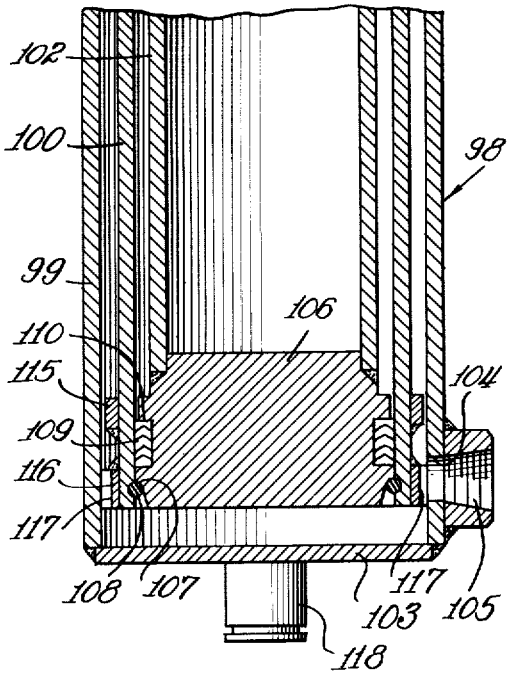
FIG. 7 is a fragmentary side sectional view illustrating structural details of a preferred type of hydraulic hoist adapted to use in my disclosed load hoisting mechanism.

As shown in FIG. 7, the outer cylinder 99 is closed at the bottom by a bottom plate 103 which is welded thereto. Near the bottom, a passage 104 and a fitting 105 are provided through which communication is established for the passage of fluid under pressure to and from the interior of the cylinder 99. As also shown in FIG. 7, the lower end of the piston 102 is closed by an end plug 106, which plug is provided with a shoulder 107 at its lower end which is adapted to engage a ring 108 on the inner surface of the sleeve 100 to limit the downward movement of the piston relative to the sleeve. Furthermore, a suitable fluid seal 109 is provided in a peripheral recess 110 in the plug 106 at the bottom end of the piston.

Since the piston has a moving seal with respect to the intermediate cylinder at the lower end of the piston, a vent 112 (FIGS. 2 and 9) is provided in guide bearing surface 113 at the top of the sleeve. *The vent 112 will relieve the buildup of pressure in the chamber provided between the spaced opposed wall portions of the piston 102 and the sleeve 100. This chamber is reduced in volume as the piston rises relative to the sleeve and expands in volume as the piston descends relative to the sleeve.* Between the outer cylinder 99 and the sleeve 100, a seal 114 is provided at the top of the outer cylinder 99, as shown in FIG. 2. At the lower end of the sleeve, spaced guide rings 115 and 116 are provided as shown in FIG. 7, which guide rings are not intended to form a seal, but merely to guide the movements of the rear end of the sleeve relative to the cylinder. As a matter of fact, the lower guide ring 116 has axial grooves 117 therein through which liquid under pressure passes into the lower portion of the cylinder while the sleeve is in its lowered position.

As may be observed, the difference in the sectional areas of the piston and cylinder produces some difference of speed in the movements of the upper end of the piston when only the piston is moving relative to the sleeve, and when both the piston and sleeve are moving relative to the cylinder during a uniform flow of fluid into or from the cylinder. This difference of speed is minimized in the disclosed structure by limiting the difference in diameters between the outer surface of the piston and the inner surface of the cylinder. This is one reason for having the seal between the piston and the sleeve at the lower end of the piston.

In order to provide some flexibility in the mounting of the lower end of the hydraulic cylinder 98, so that it may move within a limited range to follow flexure of the lifting frame without binding action, particularly in the lifting of heavy loads, the cylinder is provided with a bottom stud 118 which fits loosely into an opening in the tie plate 38 at the lower end of the base frame section 35. As shown in FIG. 12, a second plate 119 is secured to the upper surface of the bottom tie plate 38 and has an opening 120 therein, the upper portion of which opening is preferably tapered and receives the spherical surface of a washer 122 on the stud 118 adjacent the bottom plate 103 of the cylinder. The washer 122 not only spaces the bottom plate 103 of the cylinder from the plate 119, but also provides a spherical bearing surface upon which the cylinder may move within a limited range.

In the disclosed structure, the hydraulic cylinder 98 is mounted and supported at a position substantially midway between the sides of the load lifting frame and in a position substantially aligned with the mid-portion of the top cross plate 48 of the inner frame section. With this arrangement, the extension of the frame sections is effected by direct engagement of the upper end of the piston with a part on the top cross tie 46, after the end of the piston reaches that part. In view of the flexibility of the base mounting of the hydraulic cylinder and the fact that the collapsed height of the cylinder and piston is less than that of the load lifting frame, and in order to insure the maintenance of alignment of the hydraulic cylinder with the load lifting frame, I have provided a guide bar 123, the upper end of which is secured to a bracket 124 carried by a tie plate 46 at the top of the intermediate frame section. The guide bar 123 extends through a bearing 125 in the upper end of the piston, so that the piston is slidable along the guide bar to and from engagement with the lower surface of the bracket 124. In its fully extended position, the height of the hydraulic cylinder is substantially equal to the extended height of the base and intermediate frame sections. Additional means is provided for lifting the inner frame section and for effecting the movement of the load lifting apron along the frame sections.

Figure 4:
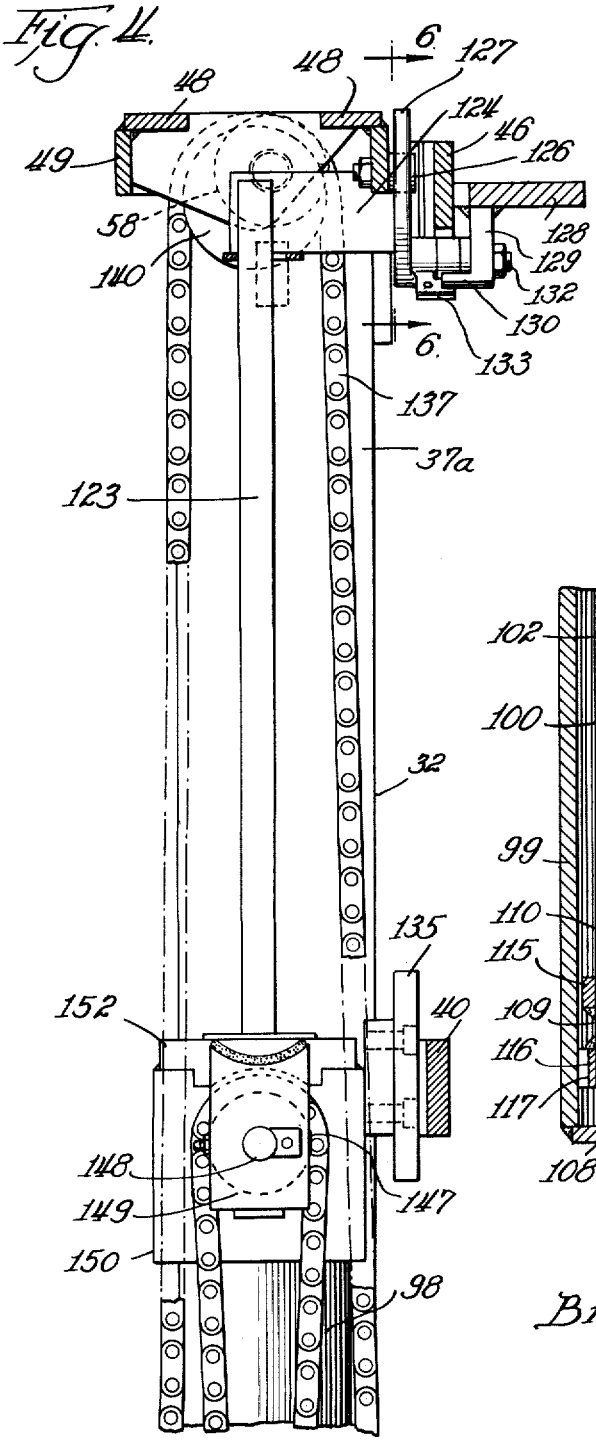
FIGS. 4 and 5 are side elevational views of my preferred load hoisting mechanism, with parts of FIG. 4 broken away and shown in section, and with the views respectively depicting the upper and lower portions of the load hoisting mechanism in substantially the same scale and separated from the lift truck.
Figure 6:
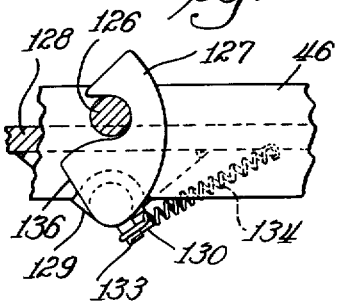
FIG. 6 is a fragmentary sectional view taken substantially on a line 6—6 of FIG. 4 and in the direction of the accompanying arrows.

When both the load lifting frame sections and the hydraulic cylinder are in their normal or collapsed positions, the sections of the load lifting frame are normally latched by a releasable mechanism for maintaining the nested relationship of the frame sections until upward movement thereof is effected by engagement of the piston with the bracket 124 on the intermediate frame section. As shown in FIGS. 2, 4 and 6, a latch stud 126 is secured to and projects rearwardly from the top cross plate 48, and is releasably engaged by a movable hook-type latch pawl 127 which is mounted on a yoke 128 secured to the upper ends of the channel members 35a and 35b of the base frame section. For mounting the movable latch pawl, as shown in FIGS. 4 and 6, a mounting plate 129 is secured to the yoke 128 and has a stop finger 130 thereon. The latch pawl 127 is mounted for rotational movement on the bracket 129 by fastening means, such as a bolt 132. On the latch pawl is a finger 133 which is aligned for engagement with the stop finger 130 for limiting rotational movement of the latch pawl under the influence of a tension spring 134 having one of its ends connected to the finger 133 and its other end anchored to the yoke 128. As shown in FIG. 2, a cam 135 is secured to the end of the piston 102 and coacts with a cam surface 136 on the pawl to move the pawl to a position in which it is released from the latch stud 125 as the piston approaches engagement with the bracket 124. On the other hand, the latch returns to its locking position relative to the latch stud 126 when the frame sections return to their nested positions and the piston moves away from the bracket 124.

*From the above, it is evident that the pawl 127 is rocked away from the stud 126 to release the inner section for upward movement of the stud 126 and inner upright relative to the pawl 127. When the inner upright is subsequently lowered, the stud will engage the upper slanted surface of the pawl and rock it in a clockwise direction to facilitate reentry of said stud into the mouth of said hook-type pawl.*

*It is further evident that the pawl 127 will securely hold the inner upright down, and that upward forces will not rock said pawl, which can be released only by an outside force, namely the cam 135.*

In the disclosed structure, flexible tension elements, in the form of a pair of substantially parallel chains 137, are utilized to effect movements of the load lifting apron 33 along the load lifting frame and to produce the extension of the inner frame section 37 relative to the intermediate frame section. The flexible tension elements 137 follow similar paths in respect to like sets of sheaves at positions on opposite sides of the hydraulic cylinder 98. On the apron, as shown in FIGS. 3, 5 and 11, angle brackets 138 are secured to the bottom cross channel and plates 90 at opposed positions on the apron 33.

These angle brackets have openings 139 therein which receive adjusting studs 140 (FIG. 5) at one end of each of the chains, and serve to anchor the chains to the apron.

From the angle brackets 138, the chains extend upwardly and over sheaves 140 which are in turn rotatably mounted on shafts 142 carried by spaced plates 143 and 144 secured to the top cross plate 48 on the inner frame section 37. From the sheaves 140, the chains extend downwardly and around sheaves 145 which are carried by brackets 146 on the tie plate 50 of the inner frame section 37. From the sheaves 145, the chains again extend upwardly and over sheaves 147 at the top of the piston 102; the sheaves 147 being rotatably supported by shafts 148 carried between side plates 149 and 150 at opposite sides of the piston and secured to a top plate 152 extending across the upper end of the piston, as shown in FIG. 2. From the sheaves 147, the chains extend downwardly and have their ends anchored to anchor bars 153, which anchor bars are movably secured between plates 154 and 155 secured to the tie plate 39 and plate 119 on the lower end of the base frame section 35. Limited swinging movements of the anchor bars 153 from front to rear of the load lifting frame are desirable to avoid or limit stress in the chain due to a variation in the action line of the chain during the movements of the piston and frame section. It may also be observed in FIG. 1, that by anchoring one end of the chain to the lower portion of the load carrying apron, the angular position of the chain varies through only a small angle of movement as the apron is raised and lowered. This also avoids having a large and disadvantageous load lifting angle in the chain when the apron is at the top of its load lifting movement.

From the foregoing description and reference to the accompanying drawings, it may be readily understood that in the operation of the disclosed load lifting apparatus, the load lifting apron is moved along the load supporting frame 32 by the action of the chains 137 and the movements of the piston to and from engagement with the bracket 124 on the intermediate section of the load lifting frame. Thus, the apron is moved along the nested sections of the frame before there is any extension of the frame. The normal height of the load lifting cylinder is so proportioned with respect to the normal height of [of] the nested frame sections that the load lifting apron is moved from the bottom to the top of the nested frame sections without any extension of the frame sections. This provides maximum usability of the load lifting apparatus in places where the overhead operating space is limited.

As extension of the hydraulic lifting cylinder progresses beyond the position in which the apron reaches the top of the nested frame sections, the piston directly acts upon the intermediate frame section to raise that section relative to the base frame section; it being understood that the latch which normally maintains the nested relationship of the frame sections is released by the movement of the piston into engagement with the intermediate frame section. As the intermediate frame section is raised by the direct action of the hydraulic cylinder, the chains act to lift the inner frame section relative to the intermediate frame section. Stops prevent the frame sections from passing their proper extended positions relative to one another.

*From the above description of the operation of the mechanism and from the previous description of the mechanism itself it is evident that the hoist has an extended height less than the extended height of the frame. This is best appreciated by noting the position of the sheaves 147 in FIG. 1.*

*As previously mentioned, the chains 137 after passing over sheaves 140, 145 and 147 are directly stationarily anchored, specifically to the base frame section 35. Since the latch means 126, 127 holds the inner section 37*

*down until the piston 102 reaches the upper end of nested frame, movement of the piston 102 upwardly from its retracted position will effect a movement of the apron 33 at double the rate of movement of the piston, because two pairs of reaches of chain will be lengthened by such piston elevation. Specifically, the chain reaches between the anchor bars 153 and the sheaves 147 will be lengthened, and the chain reaches between the sheaves 147 and the sheaves 145 will be lengthened.*

*Since the piston 102 engages the intermediate frame section just as the apron reaches the upper end of the nested frame, and since the inner section is elevated just after the apron reaches the top of said nested frame, it is evident that with the just mentioned doubling action, the stroke of the piston from its retracted position to the position where it causes elevation of the inner upright is substantially one-half of the distance from the upper end of the apron to the upper end of the nested frame.*

*After the apron 33 engages the upper end of the inner section 37, the apron and the inner section 37 will be raised in unison at twice the rate of movement of the piston 102, because any increment of upward movement of the piston will directly pull up the sheaves 145 (and thus the inner section) a distance equal to such increment, and since the reaches of chain between the piston sheaves 147 and the anchor bars 153 are lengthened by such increment, it follows that this action further raises the sheaves 145 (and thus the inner section) by a distance equal to such increment.*

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a lift truck, a load hoisting mechanism comprising, in combination, a load lifting frame having stationary and movable sections with parallel sides in telescopic engagement with one another, the stationary frame section being anchored to the lift truck and supported in an upright position, said sections being normally nested together to determine the minimum height of the frame, and one of said movable sections of the frame having a cross-piece secured thereto at the top, an hydraulic hoist of a normal height less than the minimum height of the frame and having its lower end anchored to the lift truck at a position such that it extends upwardly between said parallel sides of the frame, a guide bar secured to said cross-piece at the top of the frame and having a sliding connection to the hoist for guiding the hoist during movements to and from engagement with said cross-piece, a load lifting apron movable along the sections of the lifting frame as they are extended upwardly by the hoist, the hoist and *one of* the movable sections of said frame having sheaves thereon, a chain having one end anchored to the lift truck and the other end connected to said apron, said chain normally being taut and extending in a sinuous path over *certain of* said sheaves *and under at least one of said sheaves,* whereby *during* movement of the hoist *from its retracted position to a position* into contact with said cross-piece *the hoist* lifts the apron along the stationary frame section and continued movement of the hoist moves the apron and movable frame sections.

2. In a lift truck, a load hoisting mechanism as defined in claim 1, and wherein a releasable latch holds the frame sections in their normal nested relationship, and said hoist has means thereon for effecting release of the latch as said hoist moves into engagement with said cross-piece.

3. In a lift truck, a load hoisting mechanism as defined in claim 1, and wherein a latch mechanism and stops are provided on the frame sections for insuring sequential movements of the apron and frame sections.

4. In a lift truck, a load hoisting mechanism as defined in claim 1, and wherein the lower end of the hydraulic hoist is anchored to the lift truck through a connection providing for limited movement of the hoist, so that said hoist is free to maintain alignment with the frame during movements thereof.

5. In a lift truck, a load hoisting mechanism as defined in claim 1, and wherein said frame sections comprise opposed channels having an intermediate section of I-section therebetween, and rollers between the channel and intermediate sections for guiding the relative movements of the sections.

6. In a lift truck, a load hoisting mechanism as defined in claim 1, and wherein said sheaves and the anchored ends of said chain are so relatively disposed and aligned that all parts of the chain remain close to parallel relationship to the frame at all positions of the frame from normal to the fully extended positions thereof.

7. In a lift truck, a load hoisting mechanism as defined in claim 1, and wherein said frame has two movable sections with one movable section intermediate the stationary section and a second movable section, said sheaves being located at the top of the hoist, and at the top and bottom of the second movable section, and said chain extending from its anchored end over the sheave on the hoist, down under the sheave at the bottom of the second movable section, and thence over the sheave at the top of the second movable section and down to the load lifting apron.

8. In a hoist mechanism for a lift truck, the combination comprising a load lifting frame including a stationary section and two movable sections with parallel sides in telescoping relationship to one another for extension to a maximum height, said sections being of substantially the same height and normally in nested relationship, an hydraulic hoist having a normal height substantially less than the height of the nested frame sections and an extended height substantially equal to the extended height of two frame sections, means on one of the movable frame sections for engagement by the hoist to effect movements thereof relative to the stationary section, a load lifting apron movable along the stationary and movable frame sections between the bottom of the stationary section and the top of the extended sections, said hoist and *one of* the movable sections of said frame having sheaves thereon, a flexible tension element extending over *certain of* said sheaves *and under at least one of said sheaves* in a sinuous path, said flexible tension element having one end anchored *in stationary relation to the stationary section of said frame* and its other end secured to the load lifting apron, and the relative positions of said sheaves and the path of the flexible tension element relative thereto being such that movements of the hoist effect a predetermined sequence of movements of the load lifting apron and frame sections.

9. In a hoist mechanism for a lift truck as defined in claim 8, the normal height of the hoist is so proportioned to the height of the nested frame sections that the initial movement of the hoist to and from engagement with said means on one of the movable frame sections effects movement of the load lifting apron along the stationary frame section without moving the movable frame sections.

10. In a hoist mechanism for lift trucks as defined in claim 8, the combination being further characterized by a guide bar extending from the hoist to said means on one of the movable frame sections and having a sliding connection to the hoist so as to keep the hoist aligned with the frame during movements thereof.

11. In a hoist mechanism for lift trucks as defined in claim 8, the combination being further characterized by releasable latch means normally holding the two movable sections in their nested relationship to one another, means on the hoist for effecting release of the latch means as the hoist comes into engagement with said means on one of the movable frames, and stops for limiting movements of the frame sections relative to one another.

12. In a hoist mechanism for lift trucks as defined in claim 8, said stationary frame section and one of said movable frame sections having opposed channel sections, the other of said movable frame sections being of substantially I-shaped section and disposed between the opposed channel sections, and rollers interposed between the sections.

13. In a hoist mechanism for lift trucks, the combination comprising a three section load lifting frame wherein said sections are in telescoping relationship to one another, two of said sections being of channel cross-section and having their channels opening toward one another in opposed relationship, the third of said sections being of substantially I-shaped cross-section and fitting intermediate the said two sections with the channels on opposite sides thereof facing the channels of the said two sections, and rollers between the intermediate section and each of the two sections for guiding the sections during relative movements.

14. In a hoist mechanism for lift trucks, the combination comprising a load lifting frame including stationary and movable sections in telescoping relationship to one another and normally nested together so as to establish a minimum frame height, [an] *a three-section* hydraulic hoist *including a cylinder, a sleeve slidable linearly within the cylinder, and a piston slidable linearly within the sleeve, said piston and sleeve being of nearly the same diameter, means providing a fluid seal between the sleeve and the lower end of the piston, means providing a fluid seal between the sleeve and the top end of the cylinder, said hoist being* aligned with the frame sections and normally of a height less than said minimum frame height, a load lifting apron movable vertically along the frame, a flexible tension element for effecting movements of the load lifting apron along the frame in response to movements of the hoist, the normal height of the hoist being so related to the minimum height of the frame that said load lifting apron is moved from the bottom to the top of the frame before the frame is extended, and the lower end of the hydraulic hoist being mounted on the frame through a connection providing bearing surfaces disposed to permit limited swinging movement of the hoist relative to the frame, so that the hoist maintains alignment with the frame as the frame is extended.

15. In a hoist mechanism for lift trucks, the combination comprising a three section hydraulic hoist including a cylinder, as sleeve slidable linearly within the cylinder, and a piston slidable linearly within the sleeve, said piston and sleeve being of nearly the same diameter, means providing a fluid seal between the sleeve and the lower end of the piston, means providing a fluid seal between the sleeve and the top end of the cylinder, and a stationary guide bar extending axially of the piston and having sliding engagement with the piston for keeping the piston aligned with the cylinder.

*16. In a hoist mechanism for lift trucks, the combination comprising a load lifting frame including stationary and movable sections in telescoping relationship to one another and normally nested together so as to establish a minimum frame height, a three section hydraulic hoist including a cylinder, a sleeve slidable linearly within the cylinder, and a piston slidable linearly within the sleeve, said piston and sleeve being of nearly the same diameter, means providing a fluid seal between the sleeve and the lower end of the piston, means providing a fluid seal between the sleeve and the top end of the cylinder, said hoist being aligned with the frame sections and normally of a height less than said minimum frame height, a load lifting apron movable vertically along the frame, a flexible tension element for effecting movements of the load lifting apron along the frame in response to movements of the hoist, said element being secured at one end to said carriage and extending therefrom over first sheave means on said frame and then under second sheave means on said frame and then over third sheave means on said hoist and then being stationarily anchored, means for mounting the first and second sheave means so that they may move in unison upon extension of said frame, the normal height of the hoist being so related to the minimum height of the frame that said load lifting apron is moved from the bottom to the top of the frame before the frame is extended, and the lower end of the hydraulic hoist being mounted on the frame through a connection providing bearing surfaces disposed to permit limited swinging movement of the hoist relative to the frame, so that the hoist maintains alignment with the frame as the frame is extended.*

*17. In a hoist mechanism for lift trucks, the combination comprising a load lifting frame including stationary and movable sections in telescoping relationship to one another and normally nested together so as to establish a minimum frame height, a three-section hydraulic hoist including a cylinder, a sleeve slidable linearly within the cylinder, and a piston slidable linearly within the sleeve, said piston and sleeve being of nearly the same diameter, means providing a fluid seal between the sleeve and the lower end of the piston, means providing a fluid seal between the sleeve and the top end of the cylinder, said sleeve having means at its upper end engaging said piston, the wall portions of said sleeve between the last mentioned means and the seal at the lower end of the piston being spaced from the opposed wall portions of said piston so that an expansible and contractible chamber is provided between such wall portions, means in communication with said chamber to relieve excessive pressures built up in said chamber during contraction thereof, said hoist being aligned with the frame sections and normally of a height less than said minimum frame height, a load lifting apron movable vertically along the frame, a flexible tension element for effecting movements of the load lifting apron along the frame in response to movements of the hoist, the normal height of the hoist being so related to the minimum height of the frame that said load lifting apron is moved from the bottom to the top of the frame before the frame is extended, and the lower end of the hydraulic hoist being mounted on the frame through a connection providing bearing surfaces disposed to permit limited swinging movement of the hoist relative to the frame, so that the hoist maintains alignment with the frame as the frame is extended.*

*18. In a hoist mechanism for lift trucks, the combination comprising a load lifting frame including stationary and movable sections in telescoping relationship to one another and normally nested together so as to establish a minimum frame height, a three section hydraulic hoist including a cylinder, a sleeve slidable linearly and freely within the cylinder, and a piston slidable linearly within the sleeve, means providing fluid seals between the sleeve and the cylinder and piston, said hoist being aligned with the frame sections and normally of a height less than said minimum frame height, a load lifting apron movable vertically along the frame, a flexible tension element for effecting movements of the load lifting apron along the frame in response to movements of the hoist, the normal height of the hoist being so related to the minimum height of the frame that said load lifting apron is moved from the bottom to the top of the frame before he frame is extended, and the lower end of the hydraulic hoist being mounted on the frame through a connection providing bearing surfaces disposed to permit limited swinging movement of the hoist relative to the frame, so that the hoist maintains alignment with the frame as the frame is extended.*

*19. In a hoist mechanism for lift trucks, the combination comprising a load lifting frame including stationary and movable sections in telescoping relationship to one another and normally nested together so as to establish a minimum frame height, a three-section hydraulic hoist*

*including a cylinder, a sleeve slidable linearly within the cylinder, and a piston slidable linearly within the sleeve, said piston and sleeve being of nearly the same diameter, means providing a fluid seal between the sleeve and the lower end of the piston, means providing a fluid seal between the sleeve and the top end of the cylinder, said hoist being aligned with the frame sections and normally of a height less than said minimum frame height, a load lifting apron movable vertically along the frame, a flexible tension element for effecting movements of the load lifting apron along the frame in response to movements of the hoist, said piston being operatively connected to said element, said sleeve being free to move relative to said piston under the influence of the forces of friction and gravity and inertia and fluid pressure, said piston being the sole movable member of said hoist that is connected to any other parts of said hoist mechanism, the normal height of the hoist being so related to the minimum height of the frame that said load lifting apron is moved from the bottom to the top of the frame before the frame is extended, and the lower end of the hydraulic hoist being mounted on the frame through a connection providing bearing surfaces disposed to permit limited swinging movement of the hoist relative to the frame, so that the hoist maintains alignment with the frame as the frame is extended.*

*20. In a hoist mechanism for lift trucks, the combination comprising a load lifting frame including a stationary section and a movable section in telescoping relationship to one another and normally nested together so as to establish a minimum frame height, a three-section hydraulic hoist including a cylinder, a sleeve slidable linearly within the cylinder, and a piston slidable linearly within the sleeve, said piston and sleeve being of nearly the same diameter, means providing a fluid seal between the sleeve and the lower end of the piston, means providing a fluid seal between the sleeve and the top end of the cylinder, said hoist being aligned with the frame sections and normally of a height less than said minimum frame height, a load lifting apron movable vertically along the frame, a flexible tension element for effecting movements of the load lifting apron along the frame in response to movements of the hoist, the normal height of the hoist being so related to the minimum height of the frame that said load lifting apron is moved from the bottom to the top of the frame before the frame is extended, latch mechanism including parts on such stationary and movable frame sections to retain said sections in nested relationship until said apron has reached the upper end of said movable section, and means operable as said apron reaches the just-mentioned position to unlatch said movable section from said stationary section, and the lower end of the hydraulic hoist being mounted on the frame through a connection providing bearing surfaces disposed to permit limited swinging movement of the hoist relative to the frame, so that the hoist maintains alignment with the frame as the frame is extended.*

References Cited in the file of this patent or the original patent

UNITED STATES PATENTS

| | | |
|---|---|---|
| 2,261,930 | Abbe | Nov. 11, 1941 |
| 2,480,066 | Weaver | Aug. 23, 1949 |
| 2,505,009 | Schroeder | Apr. 25, 1950 |
| 2,514,052 | Gunning | July 4, 1950 |
| 2,527,384 | Abbe | Oct. 24, 1950 |
| 2,598,566 | Lehmann | May 27, 1952 |
| 2,666,501 | Abbe | Oct. 24, 1950 |
| 2,598,566 | Lehmann | May 27, 1952 |
| 2,666,501 | Abbe | Jan. 19, 1954 |
| 2,670,811 | Schaffer | Mar. 2, 1954 |